(12) United States Patent
Shimizu

(10) Patent No.: US 9,317,273 B2
(45) Date of Patent: Apr. 19, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventor: Toshihiro Shimizu, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/189,343

(22) Filed: Feb. 25, 2014

(65) Prior Publication Data

US 2014/0282492 A1    Sep. 18, 2014

(30) Foreign Application Priority Data

Mar. 18, 2013    (JP) .................................. 2013-055096

(51) Int. Cl.
    G06F 9/445    (2006.01)
(52) U.S. Cl.
    CPC ........................................ *G06F 8/61* (2013.01)
(58) Field of Classification Search
    CPC .......................................................... G06F 8/61
    USPC .......................................................... 717/175
    See application file for complete search history.

(56) References Cited

U.S. PATENT DOCUMENTS

| 7,203,937 | B1* | 4/2007 | Kyle et al. ...................... 717/168 |
| 2006/0048137 | A1* | 3/2006 | Nosseir et al. ................. 717/174 |
| 2012/0331455 | A1* | 12/2012 | Ayachitula et al. ........... 717/171 |
| 2013/0179480 | A1* | 7/2013 | Agarwal et al. ............... 707/822 |
| 2013/0179865 | A1* | 7/2013 | Neumeyer et al. ............ 717/127 |
| 2014/0081940 | A1* | 3/2014 | Everett et al. ................. 707/705 |

FOREIGN PATENT DOCUMENTS

| JP | 06-230948 | 8/1994 |
| JP | 2000-242504 | 9/2000 |
| JP | 2003-15881 | 1/2003 |
| JP | 2006-133825 | 5/2006 |
| JP | 2007-79703 | 3/2007 |
| JP | 2007-080166 | 3/2007 |
| JP | 2010-123045 | 6/2010 |

* cited by examiner

*Primary Examiner* — Anna Deng
(74) *Attorney, Agent, or Firm* — Fujitsu Patent Center

(57) ABSTRACT

A processor obtains a plurality of commands executed in an installation of software on an information processing apparatus, and obtains information affected by execution of the plurality of commands in an operating environment of the information processing apparatus. The processor extracts, according to the affected information, a plurality of commands related to generation of a plurality of files or a plurality of processes that are present when the installation ends normally, and outputs the extracted commands.

15 Claims, 18 Drawing Sheets

```
(1) $ {install epel}
(2) $ gem install ... # fail
(3) $ gem install --no-http-proxy ... # fail
(4) $ gem install -verbose ... # fail
(5) $ ls # succ
(6) $ {remove epel}
```

F I G. 1

```
(1) ${install epel}
(2) $ yum install openssl-devel readline-devel zlib-devel # succ
(3) $ yum install mysql-server mysql-devel # succ
(4) $ gem install ... # fail
(5) $ gem install --no-http-proxy ... # fail
(6) $ gem install --verbose ... # fail
(7) $ ls # succ
(8) ${remove epel}
```

FIG. 2

```
(1) ${install epel}
(2) $ yum install ... # succ
(3) $ ls # succ
(4) ${remove epel}
```

FIG. 3

| ORDER | COMMAND | SYSTEM CALL STRING |
|---|---|---|
| 1 | ls | open("/etc/ld.so.preload", R_OK)=3<br>fstat(3, ...)<br>read(3, ...) |
| 2 | ... | ... |
| ... | ... | ... |

F I G. 6

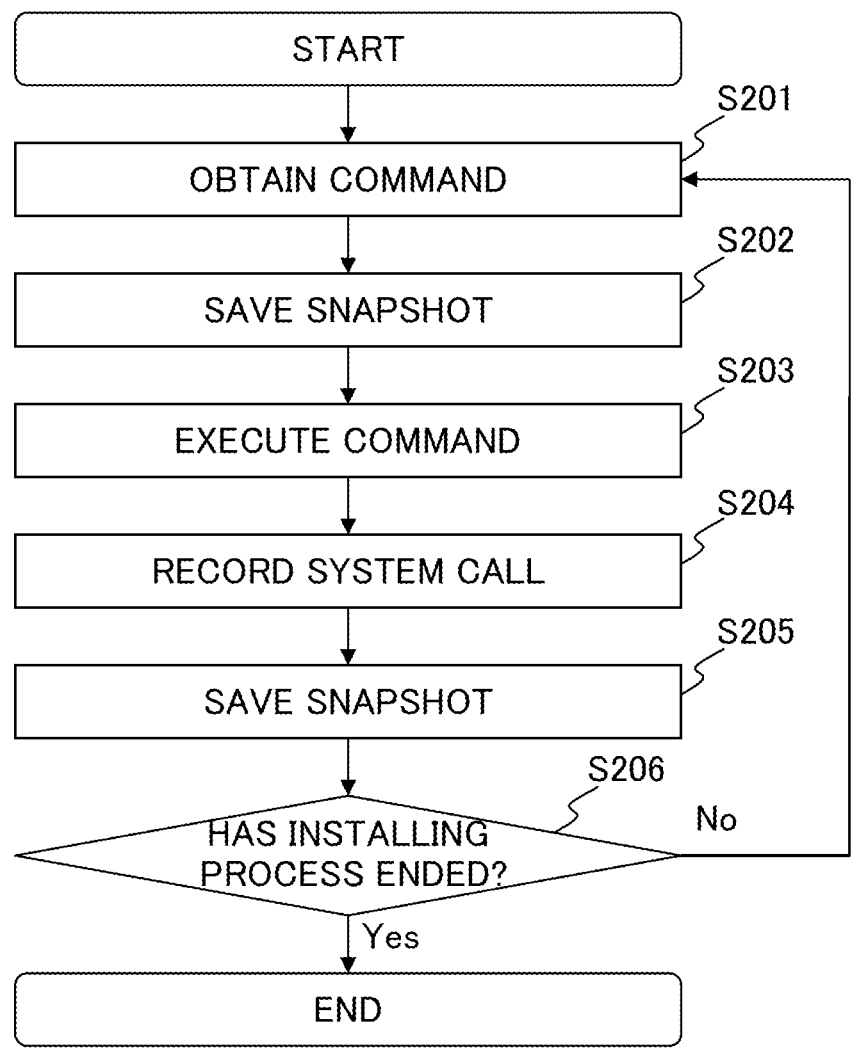
F I G. 7

FIG. 9

| ORDER 31 | INPUT 32 | COMMAND 33 | OUTPUT 34 |
|---|---|---|---|
| 1 | /etc/ld.so.cache<br>/lib/libselinux.so.1<br>. . . | ls | file :<br>new process :<br>env : stdout : "¥n.¥n.emacs" |
| 2 | /etc/ld.so.preload<br>f :CONTENT OF f<br>. . . | sed -i<br>'s/hello/hi/g' f | file :f :CONTENT OF f<br>new process :<br>env : |
| 3 | /etc/ld.so.preload<br>. . . | p& | file :<br>new process :<br>env : stdout : "¥n.¥n.emacs" |
| 4 | . . . | . . . . . | . . . . |
| . . . | | | |

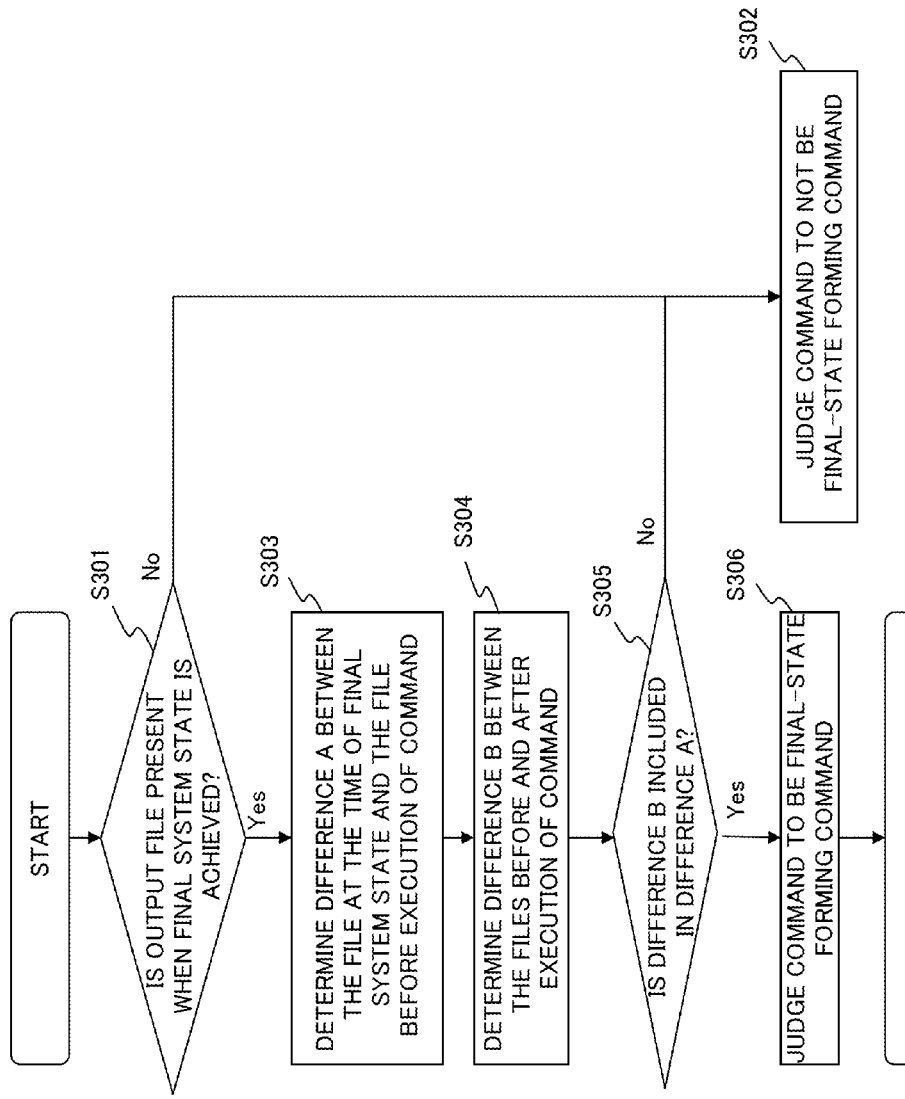
F I G. 11

| ORDER 31 | INPUT 32 | COMMAND 33 | OUTPUT 34 |
|---|---|---|---|
| 1 | — | C0 | file : F : "a" |
| 2 | F : "a" | C1 | file : F : "a, b" |
| 3 | F : "a, b" | C2 | file : F : "a, c" |
| 4 | F : "a, c" | C3 | file : F : "a, c, d" |
| 5 | F : "a, c, d" | C4 | file : F : "a, c, e" |
| 6 | F : "a, b" | C5 | file : G : "x" |
| 7 | G : "x" | C6 | file : G : "y" |
| 8 | G : "y" | C7 | file : G : "z" |
| 9 | G : "y" | C8 | new process : P |

FIG. 13

```
(1)$ cd ~/tmp
(2)$ wget http://.../p
(3)$ cd dir0
(4)$ cd /usr/local/src/...
(5)$ patch < ~/tmp/p
(6)$ cp f /usr/local/lib/...
(7)$ rm ~/tmp/p
```

| ORDER | INPUT | COMMAND | OUTPUT |
|---|---|---|---|
| 1 | — | cd ~/tmp | env : ${PWD}= ~/tmp |
| 2 | ${PWD}= ~/tmp | wget http://.../p | file : ~tmp/p |
| 3 | ${PWD}= ~/tmp | cd dir0 | env : ${PWD}=dir0 |
| 4 | ${PWD}=dir0 | cd /usr/local/src/... | env : ${PWD}=/usr/local/src/... |
| 5 | ~tmp/p ${PWD}=/usr/local/src | patch < ~/tmp/p | file : /usr/local/src/...f |
| 6 | /usr/local/src/...f | cp f /usr/local/lib/... | file : /usr/local/lib/...f |
| 7 | ~/tmp/p | rm ~/tmp/p | — |

31  32  33  34

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2013-055096, filed on Mar. 18, 2013, the entire contents of which are incorporated herein by reference.

FIELD

The embodiments discussed herein are related to an information processing apparatus and an information processing method.

BACKGROUND

Computers have various pieces of software installed thereon and have various settings made therefor. Installations of software and setting operations are called deployments. In the providing of the same deployments for load distribution, or in the providing of the same deployments as that of an old machine for a new machine when a failure occurs, an operation to provide the same deployments is sometimes performed a plurality of times. In the past, due to there being a small number of computers or a change in an environment (e.g., in a reconfiguring process to address a failure, no servers are completely the same as those at the time of building), an attempt was not often made to build many servers with the same environment. In recent years, however, a virtual environment called a "cloud" has allowed many identical environments to be prepared over a long period of time, thereby increasing the need to provide the same deployment. In such a case, possible solutions to shorten the time wasted due to an operational error or due to trial and error during an operation are the creation of a procedure manual for a deployment and the creation of a program for automatic deploying.

Not all of the operation procedures for installation are known from the beginning: installation or a setup operation is performed once, and, from the record thereof, the operation procedures are created. This is because, in many cases, installation manuals are specialized in a particular environment, and they often indicate rough installation procedures without describing specific installation procedures. This is because, in accordance with the version of an Operating System (OS), different types of software are installed, and different objects are supported by a package management system.

It is to be noted that a procedure is not recognized directly from the record of a deployment because the record of a deployment sometimes includes a process that is not related to an installation procedure. During a deployment task, trial and error is often performed; e.g., a wrong parameter is set, unnecessary processes are performed for displaying a file or a time on a screen, and mistakenly installed unnecessary software is deleted. It is difficult for the manual creator to determine from the record of executions whether such wasteful tasks were actually unnecessary. In a task finished in a few minutes, it may be soon clarified what is unnecessary; however, many tasks continue for several hours, and several hundred commands are sometimes executed. Thus, manuals and programs created by pulling out information from a procedure record sometimes lack a desirable process but include an undesirable process, and it is difficult to create a sufficient manual or program in one attempt.

In recent years, in particular, unification of a development and an operation, which is called DevOps, has been advocated. DevOps indicates removing a barrier between a development (Dev) and operations (Ops), and, in particular, DevOps indicates that a developer and an operator proceed with a task with consideration for each other. In such DevOps, it is desirable in particular to speed up the communication between the developer and the operator The developer actually performs an installation task, makes a close investigation of the result of the task, and creates an installation script or a manual for a piece of developed software in consideration of the operator. The developer desirably quickly creates the installation script or the manual.

The operator also provides, for example, feedback on a difficulty of installation to the developer and reports a failure that occurred in installation (e.g., reports what was unnecessary). The operator makes a close investigation of the failure and reports the result to the developer so that the developer can readily check details of the failure for correction.

Technologies are also present for creating a procedure from a task record of a deployment.
Japanese Laid-open Patent Publication No. 6-230948
Japanese Laid-open Patent Publication No. 2007-80166
Japanese Laid-open Patent Publication No. 2000-242504
Japanese Laid-open Patent Publication No. 2010-123045
Japanese Laid-open Patent Publication No. 2003-15881
Japanese Laid-open Patent Publication No. 2007-079703
Japanese Laid-open Patent Publication No. 2006-133825

SUMMARY

According to an aspect of the embodiments, an information processing apparatus includes a processor. The processor obtains a plurality of commands executed in an installation of software on the information processing apparatus, and obtains information affected by execution of the plurality of commands in an operating environment of the information processing apparatus. The processor extracts, according to the affected information, a plurality of commands related to generation of a plurality of files or a plurality of processes that are present when the installation ends normally, and outputs the extracted commands.

The object and advantages of the embodiment will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an installing process (pattern 1);

FIG. 2 illustrates an example of an installing process (pattern 2);

FIG. 3 illustrates an example of an installing process (pattern 3);

FIG. 6 illustrates an example of observational data in accordance with the embodiment;

FIG. 7 is an operation flow diagram of a log saving process in accordance with the embodiment;

FIG. 9 illustrates an exemplary input-output list (pattern 1);

FIG. 11 is a flow diagram of an operation performed when an analyzing process unit 15 determines whether a command that includes a file in an output is a final-state forming command;

FIG. 13 illustrates an exemplary input-output list (pattern 2);

FIG. 16 illustrates an exemplary procedure used in the installing of a patch file.

FIG. 17 illustrates an exemplary input-output list (pattern 3); and

DESCRIPTION OF EMBODIMENTS

Figure 4:
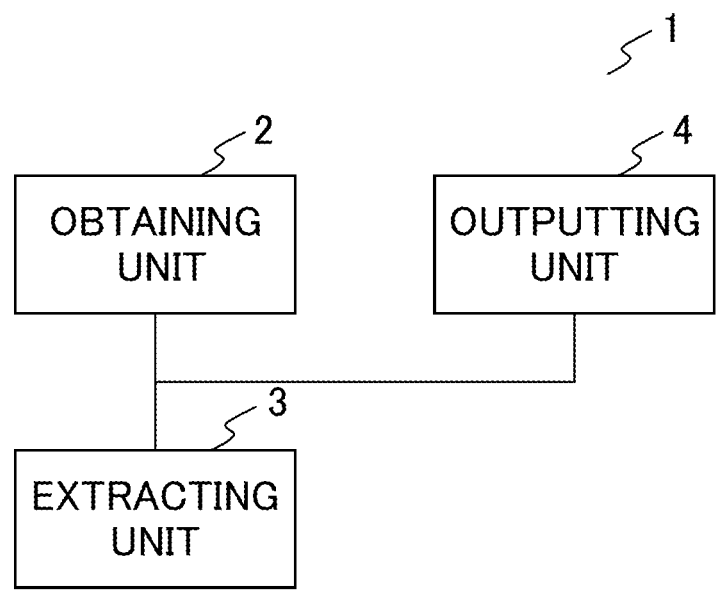
FIG. 4 illustrates an exemplary block diagram of an information processing apparatus in accordance with the embodiment.

In the present embodiment, a procedure-manual creator performs an installation task, and an information processing apparatus obtains a command input by the procedure-manual creator in the installation task and has log information saved therein. Using the log information, a process is performed of selecting a file related to installation. This leads to a decrease in the time required to create a procedure manual or an installation script. DevOps allows feedback on a command that was not required or was redone by an operator to be easily provided to a developer.

First, descriptions will be given of examples of commands that are not related to an installing process in an installation task performed by a procedure-manual creator to create a procedure manual.

For example, thought will be given to an installing process in which a series of commands such as those indicated in FIG. 1 are executed. First, contents of the commands will be described. An "{install epel}" of (1) means obtaining a package "epel.rpm" via, for example, a command "wget" and installing this received package via a command "rpm -ihv". A command "gem install" of (2), (3), and (4) is a command to install a package. In this example, all of the commands of (2), (3), and (4) end abnormally, and a file is not added via installation. An "ls" of (5) is a command to display the information of a file or a directory. Executing the command "ls" does not cause a side effect on the system. In this example, "ls" has ended normally. A "{remove epel}" of (6) means uninstalling the package "epel" via a command "rpm -e" and deleting a file via an "rm" command. For illustration, FIG. 1 indicates "#succ" and "#fail", which respectively indicate that a command has succeeded and that a command has failed.

In the example of FIG. 1, an installing process via the command "gem install" fails, and all the commands in FIG. 1 are not needed to create a procedure manual.

For other examples of the commands that are not to be reflected in the procedure manual, thought will also be given to an installing process in which a series of commands such as those in FIG. 2 are executed. (1) and (4)-(8) are similar to the commands described with reference to FIG. 1. A command "yum install" of (2) and (3) is a command to obtain and install a package. Assume that all of the commands of (2) and (3) have ended normally and that these commands have a side effect on the system. In the example of FIG. 2, the commands of (2) and (3) are unrelated to a side effect of epel installed in (1).

In the example of FIG. 2, an installing process via the command "gem install" has failed, and the commands of (1) and (4)-(8), unrelated to the command "yum install", are not needed to create the procedure manual.

In addition, for still other examples of the commands not to be reflected in the procedure manual, thought will also be given to an installing process in which a series of commands such as those in FIG. 3 are executed. In the example of FIG. 3, the command "yum install" of (2) is related to a side effect of "epel".

In the example of FIG. 3, the command "ls" of (3) without a side effect is not needed to create the procedure manual.

As illustrated in FIG. 1 to FIG. 3, a command executed in an installing process could end abnormally, and a command unrelated to installation could be executed. Such a command unrelated to installation is not described for the creating of a procedure manual.

In the embodiment, according to a side effect of a plurality of commands executed in installation, a command related to installation is extracted from the plurality of commands executed in installation. The side effect of a command herein indicates the information affected by execution of the command.

Processes performed by an information processing apparatus in accordance with the embodiment are roughly divided into the three processes: a log saving process, a command extracting process, and an outputting process. The log saving process is a process performed when a procedure-manual creator performs an installation task, the process being a process of saving, as log information, a command executed in the installation task and an influence exerted by execution of the command on an operating environment of the information processing apparatus. The command extracting process is a process of extracting a command related to installation by referring to the log information. The outputting process is a process of outputting an extracted command.

FIG. 4 illustrates an example of a functional block diagram of an information processing apparatus in accordance with the embodiment. An information processing apparatus 1 includes an obtaining unit 2, an extracting unit 3, and an outputting unit 4.

The obtaining unit 2 obtains a command executed in the installation of a program on the information processing apparatus and obtains information affected by execution of the command in an operating environment of the information processing apparatus. The affected information includes, for example, a file, a process, and an environment variable.

According to the affected information, the extracting unit 3 extracts a plurality of commands related to the generation of a plurality of files or a plurality of processes that are present when installation ends normally. The extracting unit 3 detects a plurality of objective files which are the files that are present when installation ends normally. When a difference between one objective file before execution of an objective command that is any of one or more commands executed for the one objective file and the one objective file after the execution of the objective command is included in a difference between the one objective file at the time of the normal end of installation and the one objective file before the execution of the objective command, the extracting unit 3 extracts the objective command. The extracting unit 3 detects a plurality of objective files which are the files that are present when installation ends normally, and extracts a plurality of commands to generate the plurality of objective files. When a first file with a name that is different from that of a second file output by a command is generated via execution of the extracted command for the second file, the extracting unit 3 extracts the command that has output the second file. When the one objective file is obtained via an extracted command and a command executed with a nonobjective file, which is a file that is not present when installation ends normally, as an input, the extracting unit 3 extracts the command that has output the nonobjective file.

The outputting unit 4 outputs the extracted commands.

Figure 5:
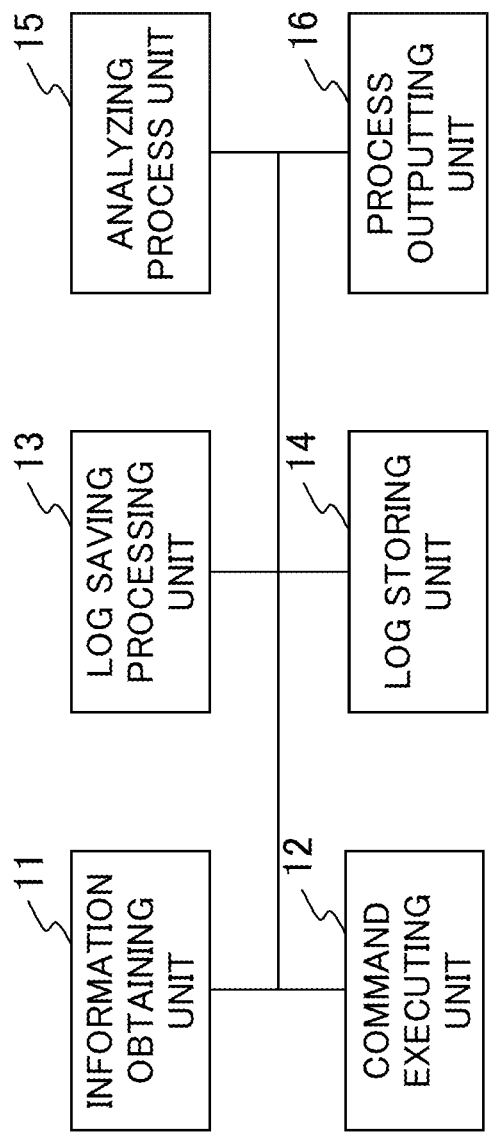
FIG. 5 illustrates an exemplary configuration of an information processing apparatus in accordance with the embodiment.

Descriptions will be given of an exemplary configuration of the information processing apparatus 1 in accordance with the embodiment. FIG. 5 illustrates an exemplary configuration of an information processing apparatus in accordance with the embodiment.

As illustrated in FIG. 5, the information processing apparatus 1 includes an information obtaining unit 11, a command executing unit 12, a log saving processing unit 13, a log storing unit 14, an analyzing process unit 15, and a process outputting unit 16. The information obtaining unit 11 is an example of the obtaining unit 2. The analyzing process unit 15 is an example of the extracting unit 3. The process outputting unit 16 is an example of the outputting unit 4.

In an installation task performed by a user to create a procedure manual, the information obtaining unit 11 obtains a command input by the user using an input apparatus.

The command executing unit 12 executes the command obtained by the information obtaining unit 11.

The log saving processing unit 13 saves in the log storing unit 14 the log information of the installation task performed by the user to create a procedure manual.

The log storing unit 14 stores the log information saved by the log saving processing unit 13.

Using the log information stored in the log storing unit 14, the analyzing process unit 15 selects a command related to installation from a series of commands in the installing process performed to create a procedure manual.

The process outputting unit 16 outputs the command selected by the analyzing process unit 15. Destinations of the commands output by the process outputting unit 16 are various elements, e.g., a file and a screen display apparatus for checking by the user.

Next, descriptions will be given of details of processes performed by the log saving processing unit 13.

The log saving processing unit 13 saves in the log storing unit 14 the log information of an installation task performed by the user to create a procedure manual. In the embodiment, log information includes snapshots of the system before and after execution of each command and the information of a system call invoked via execution of each command.

The log saving processing unit 13 obtains snapshots of the system before and after execution of each command as one piece of log information and saves these snapshots in the log storing unit 14. A snapshot is the file information of the entirety of a file system of the information processing apparatus 1. The snapshot may include the file information stored in an apparatus provided outside the information processing apparatus 1.

As a second piece of log information, the log saving processing unit 13 obtains the information of a system call executed by a command. A specific saving method uses, for example, a system call hook and a monitor command to monitor a received signal and a system call used by a command. Such a monitor command includes, for example, a "strace" command in Linux and a "truss" command in Unix. The information of a system call invoked via execution of a command will hereinafter be referred to as "observational data" when this information is recorded by the log saving processing unit 13.

FIG. 6 illustrates an example of observational data in accordance with the embodiment. Observational data 20 includes data items such as an order 21, a command 22, and a system call string 23.

The order 21 is information indicating an order in which a series of commands are executed in an installing process. The order 21 allocates a unique value to each command in a manner such that a smaller value is allocated to a command executed earlier from among the commands 22.

The commands 22 are each a command executed in an installation task performed by a user to create a procedure manual. The commands 22 store the information of a command obtained by the log saving processing unit 13 from the information obtaining unit 11.

The system call string 23 is a list of system calls generated via execution of the command 22.

The data structure of the observational data 20 illustrated in FIG. 6 is a table structure, but, as long as correspondences between the order 21, the command 22, and the system call string 23 can be determined, various data structures may be used.

Next, descriptions will be given of the operation flow of a log saving process in accordance with the embodiment. FIG. 7 is an operation flow diagram of a log saving process in accordance with the embodiment.

First, the information obtaining unit 11 obtains a command input by a user using an input apparatus in an installing process (S201). Next, the log saving processing unit 13 saves a snapshot of a file system in the log storing unit 14 (S202). Then, the command executing unit 12 executes the command obtained by the information obtaining unit 11 (S203). Subsequently, just after the command executing unit 12 executes the command, the log saving processing unit 13 saves in the log storing unit 14 the information of a system call invoked by the command (S204). The log saving processing unit 13 saves the snapshot of the system in the log storing unit 14 (S205). The information obtaining unit 11 determines whether the installing process has been completed (S206), and, when the installing process has not been completed, the process shifts to S202. Then, the operations of S201 to S206 are repeated. The process ends when the installing process is completed (Yes in S206).

Next, descriptions will be given of details of a process performed by the analyzing process unit 15.

Using the log information stored in the log storing unit 14, the analyzing process unit 15 selects a command related to an installation procedure from a series of commands in an installing process designed to create a procedure manual.

An operating environment of the information processing apparatus 1 achieved at a predetermined time point will hereinafter be referred to as a "system state". System states are states of a file, a process, and an environmental variable.

An installation task is a set of side effects on a system, such as a file, and the installation task finally forms a particular system state. Accordingly, the analyzing process unit 15 determines whether a command executed in installation has affected the state of the system at the time of a normal completion of the installation (hereinafter referred to as a "final system state") so as to determine whether the command relates to the installation. A determination as to whether the command has affected the final system state is made according to a difference between side effects of commands or according to whether a file or a process has been generated as a side effect. A process of checking a relationship between side effects of a series of commands executed in an installation task will hereinafter be referred to as "analyzing of a side effect". System states may include a system state of an external apparatus and a state wherein a predetermined file is not present. Assume that, in the final system state, elements, such as an unnecessary file generated in installation, have all been deleted. Alternatively, in accordance with a kind of software to be installed, a condition satisfied when the installation is completed normally may be preset, and the system state that satisfies the condition may be defined as a final system state (e.g., a state in which a particular file is present).

Side effects caused by execution of a command are roughly divided into those that are on a file, a process, an environmental variable, and another element. Side effects on a file include a change in a file content, creation of a file, and deletion of a file, all of which are caused by execution of a command. Side effects on a process include generation or deletion of a process (including, for example, a background process such as a daemon). Side effects on an environmental variable include setting an environmental variable. Side effects on another element include transmission of information to or reception of information from outside the information processing apparatus 1, the switching of a user of a shell by a command such as "su", and setting a service by a command such as "chkconfig". An operation for which a service is set by a command such as "chkconfig" may be regarded as being an operation for which a change has been made to a file.

A command that affects a final system state and that is related to installation will hereinafter be referred to as a "final-state forming command". A file that is present when a final system state is achieved and that is related to installation will hereinafter be referred to as a "final file".

Figure 8:
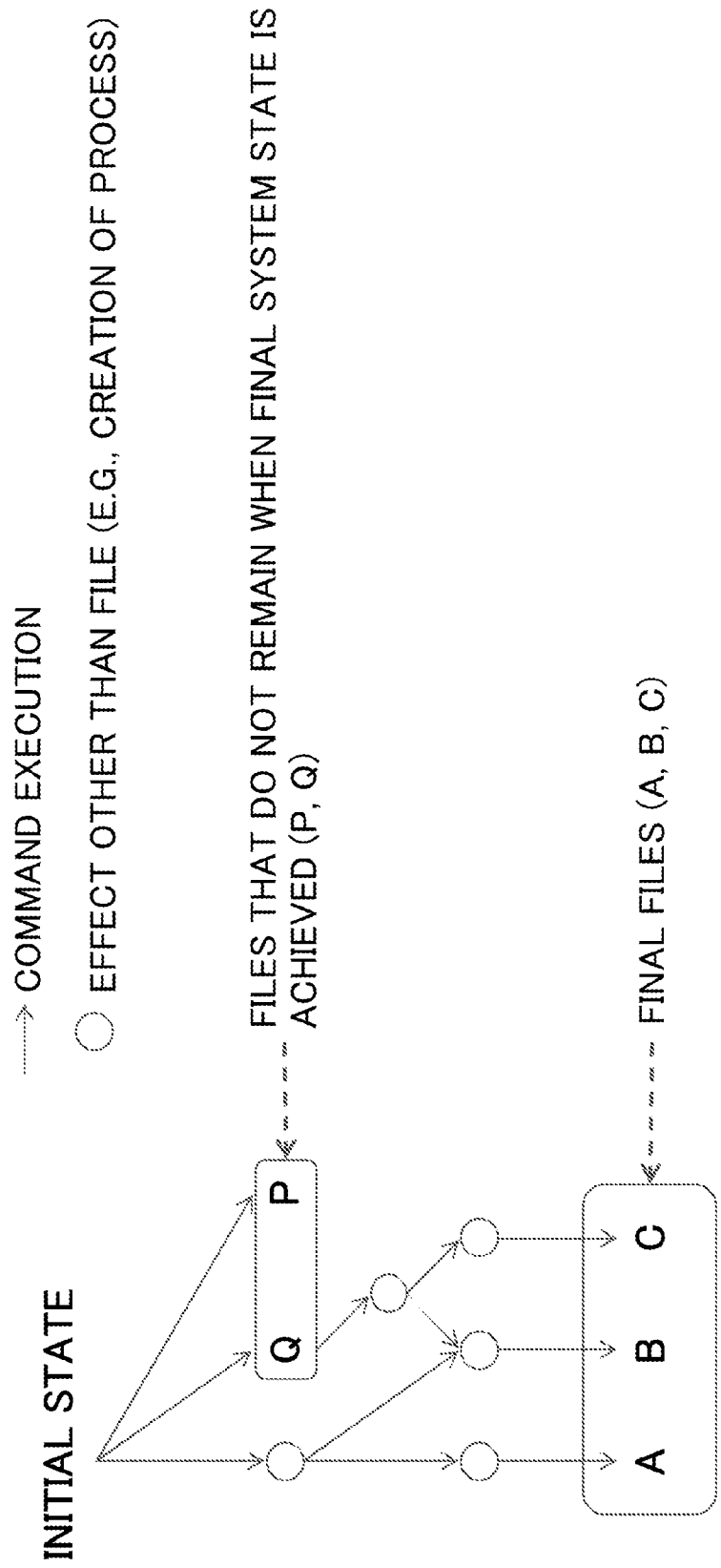
FIG. 8 illustrates a final-state forming command of a series of commands in an installing process.

FIG. 8 illustrates a final-state forming command of a series of commands in an installing process. In FIG. 8, final files are files A, B, and C. Executing a command by starting with an initial state leads to creation of files Q and P. The file Q is given to a command as an input, and executing the command leads to creation of the files B and C. Meanwhile, the file P is not related to the creation of the file A, B, or C. In this case, the command to create the file P is judged not to be a final-state forming command.

Next, detailed descriptions will be given of an operation performed by the analyzing process unit 15 to analyze aside effect. In the analyzing of aside effect, the analyzing process unit 15 checks a relationship between side effects of a series of commands executed in an installation task. To analyze a side effect, the analyzing process unit 15 creates an input-output list by extracting, from the log information saved in the log storing unit 14, a file that is used as an input of each command in the executing of the command and all of the side effects that occur when each command is executed.

FIG. 9 illustrates an exemplary input-output list. The input-output list includes data items such as an order 31, an input 32, a command 33, and an output 34.

The order 31 is information indicating an order in which a series of commands are executed in an installing process.

The input 32 is input information of the command 33. The input 32 indicates, for example, an argument provided when the command 33 is executed or a file used in a process of the command 33. The input 32 is extracted using a snapshot obtained before a command is executed and the observational data 20.

The command 33 is a command executed in an installation task performed by a user to create a procedure manual.

The output 34, which is output information of the command 33, is all of the side effects that occur when each command is executed. The output 34 is extracted using a snapshot obtained before a command is executed and the observational data 20. The information of a process generated or deleted via the execution of a command is specified using the observational data 20, but such information may be configured to be specified according to statistical information. For example, a command is executed in advance on a Virtual Machine (VM) created in a cloud environment, and a process generated or deleted via the execution of the command is saved as statistical information. The analyzing process unit 15 refers to the saved statistical information so as to specify the information of the process generated or deleted via the execution of the command.

In the example of FIG. 9, referring to the command 33 at a row indicating "1" as the order 31 clarifies that a command "ls" is executed at the beginning of the installing process. The input 32 indicates "/etc/ld.so.cache", "/lib/libselinux.so.1", and so on as inputs of "ls". The output 34 indicates "file:", "new process:", and 'env: stdout: ".¥n..¥n.emacs"' as outputs of "ls". In the example of FIG. 9, "file name: file content" is next to "file:". The process name created via the execution of the command is stored next to "new process:", and an environmental variable name that is set and a value thereof are stored next to "env:". That is, the output 34 indicates, as a side effect on the environmental variable, the fact that a content of "stdout" has been changed into ".¥n..¥n.emacs". The output 34 also indicates that there are no side effects on a file, a process, and the like.

The data structure of the log information illustrated in FIG. 9 is a table structure, but, as long as correspondences between the order 31, the input 32, the command 33, and the output 34 can be determined, various data structures may be used. The forms indicated as the output 34 are not limited to those illustrated in FIG. 9 but may be saved in various forms. For example, when a file (including a directory) is created, "new file: file name" may be indicated, and when a file is deleted, "delete file: file name" may be indicated. When a process is deleted, "delete process: process name" is indicated, and information is saved in the output 34 so that all of the side effects caused by a command can be distinguished from each other.

Next, when the analyzing process unit 15 creates an input-output list, the analyzing process unit 15 performs a process of selecting a final-state forming command using the created input-output list.

Figure 10:
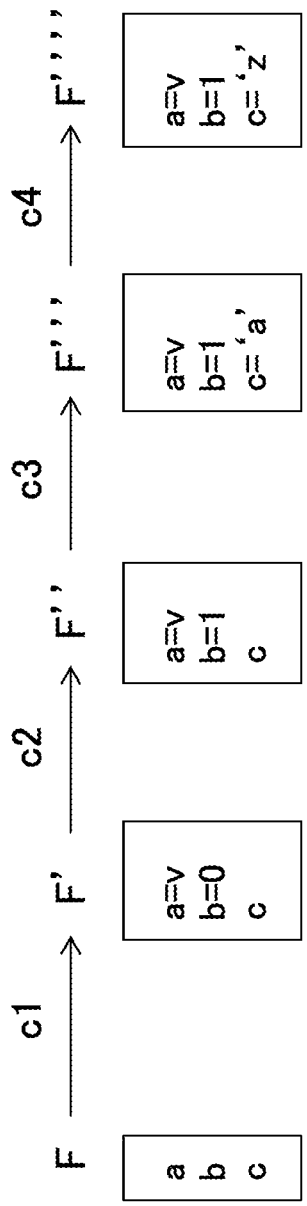
FIG. 10 illustrates a situation wherein a final-state forming command is selected when a content of a file changes due to a side effect of each of a plurality of commands.

First, descriptions will be given of a situation in which a final-state forming command is selected when a content of one file changes due to a plurality of commands. FIG. 10 illustrates a situation in which a final-state forming command is selected when a content of a file with a single name change due to a side effect of each of a plurality of commands.

FIG. 10 depicts an example in which a file F'''' is obtained after commands c1, c2, c3, and c4 are executed in sequence for a file F. F to F'''' indicate files with an identical file name, each of which has a different content. In the initial state, the content of the file F is composed of a, b, and c. Executing the command c1 under a condition in which the file F is an input assigns v to a and 0 to b, thereby providing the file F'. Executing the command c2 under a condition in which the file F' is an input assigns 1 to b, thereby providing the file F''. Executing the command c3 under a condition in which the file F'' is an input assigns 'a' to c, thereby providing the file F'''. Executing the command c4 under a condition in which the file F'''' is an input assigns 'z' to c, thereby providing the file F''''.

Neither 0, which is assigned to b, nor 'a', which is assigned to c, emerges in the final file F''''. Accordingly, the operation to assign 0 to b and the operation to assign 'a' to c are judged to be operations that do not affect the final system state. In this example, the command c3 only leads to the operation to assign 'a' to c, and hence the command c3 is judged to not be a final-state forming command. In addition to the operation to assign 0 to b, the command c1 leads the operation to assign v to a, and hence the command c1 is judged to be the final-state forming command.

Next, specific descriptions will be given of an operation performed by the analyzing process unit 15 to select a final-state forming command under a condition in which, as illustrated in FIG. 10, a content of one file is changed by a plurality of commands. FIG. 11 is a flow diagram of an operation performed when the analyzing process unit 15 determines whether a command that includes a file as an output is a final-state forming command.

To determine whether a certain command X is a final-state forming command, the analyzing process unit 15 first determines whether a file Y output by the command X is present when a final system state is achieved (S301). Determining that the file Y is not present when the final system state is achieved (No in S301), the analyzing process unit 15 determines that the command X is not a final-state forming command (S302). Determining that the file Y is present when the final system state is achieved (Yes in S301), the analyzing process unit 15 determines a difference A between a content of the file Y at the time of the final system state and a content of the file Y before execution of the command X (S303). Then, the analyzing process unit 15 determines a difference B between contents of the file Y before and after execution of the command X (S304). The analyzing process unit 15 determines whether the difference B is included in the difference A (S305). When the difference B is included in the difference A (Yes in S305), the analyzing process unit 15 judges the command X to be a final-state forming command (S306). When the difference B is not included in the difference A, (No in S305), the analyzing process unit 15 judges the command X to not be a final-state forming command (S302).

Under a condition in which the flow depicted in FIG. 11 is applied to FIG. 10, descriptions will be given of a flow of an operation performed when the analyzing process unit 15 determines whether a command that includes a file as an output is a final-state forming command.

First, descriptions will be given of an operation performed when a command X in the description of FIG. 11 is the command c1 in FIG. 10. To determine whether the command c1 is a final-state forming command, the analyzing process unit 15 first determines whether the file F', which is an output file of the command c1, is included in final files (S301). The result of the determination indicates a judgment of Yes because the final file is F''''. Next, the analyzing process unit 15 determines a difference A between the final file F'''' and F, which is an input file of the command c1 (S303). The difference A between F'''' and F corresponds to a=v, b=0, and c='z'. The analyzing process unit 15 also determines a difference B between the file F', which is an output file of the command c1, and the file F, which is an input file of the command c1 (S304). The difference B between F' and F corresponds to a=v and b=0. Using the results obtained in S303 and S304, the analyzing process unit 15 determines that the difference B is included in the difference A (Yes in S305). Then, the analyzing process unit 15 determines that the command c1 is a final-state forming command (S306).

Next, descriptions will be given of an operation performed when X in FIG. 11 is the command c3. To determine whether the command c3 is a final-state forming command, the analyzing process unit 15 first determines whether the file F''', which is an output file of the command c3, is included in final files (S301). The result of the determination indicates a judgment of Yes because the final file is the file F''''. Next, the analyzing process unit 15 determines a difference A between the final file F'''' and the file F''', which is an input file of the command c3 (S303). The difference A between F'''' and F''' corresponds to c='a'. The analyzing process unit 15 also determines a difference B between the file F''', which is an output file of the command c1, and the file F'', which is an input file of the command c1 (S304). The difference B between F''' and F'' corresponds to c='z'. Using the results of S303 and S304, the analyzing process unit 15 determines that the difference B is included in the difference A (Yes in S305). Then, the analyzing process unit 15 determines that the command c3 is a final-state forming command (S306).

Figure 12:
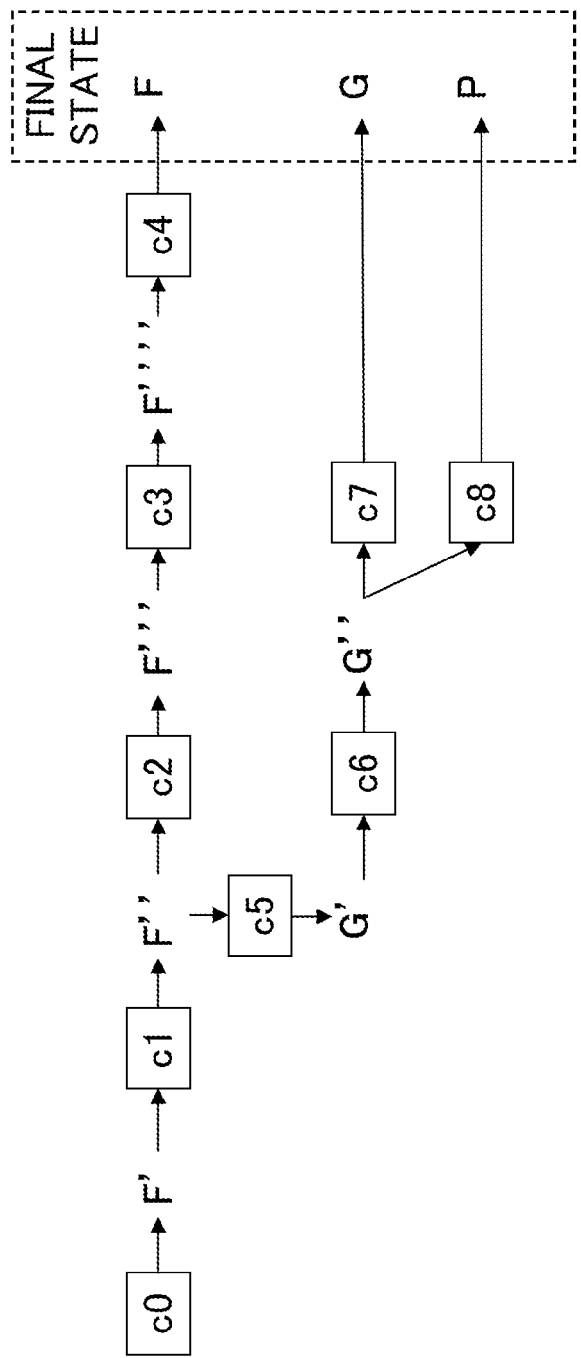
FIG. 12 illustrates a situation wherein a final-state forming command is selected when a plurality of commands cause a side effect on a plurality of files and on a plurality of processes.

Next, descriptions will be given of a situation in which a final-state forming command is selected when a plurality of commands cause a side effect on a plurality of files and a plurality of processes. FIG. 12 illustrates a situation in which a final-state forming command is selected when a plurality of commands cause a side effect on a plurality of files and a plurality of processes.

In the example of FIG. 12, the final system state is a state in which files F and G and a process P are created. First, the analyzing process unit 15 creates an input-output list from the log information stored in the log storing unit 14. FIG. 13 illustrates an input-output list created in the example of FIG. 12.

Next, the analyzing process unit 15 determines that a set of commands that have created a file and a process included in the final system state are final-state forming commands. In the example of FIG. 12, commands {c0, c5, c8} that create the files F and G and the process P, which are included in the final system state, are judged to be final-state forming commands. A set of commands judged to be final-state forming commands will be indicated as S.

Next, in accordance with the flow of FIG. 11, the analyzing process unit 15 extracts a final-state forming command from the commands that generate a side effect that changes a content of a file included in the final system state.

First, the analyzing process unit 15 focuses on the file F and selects a final-state forming command from the commands that change the file F. As illustrated in FIG. 12, commands c1 to c4 generate a side effect that changes a content of the file F.

Figure 14:
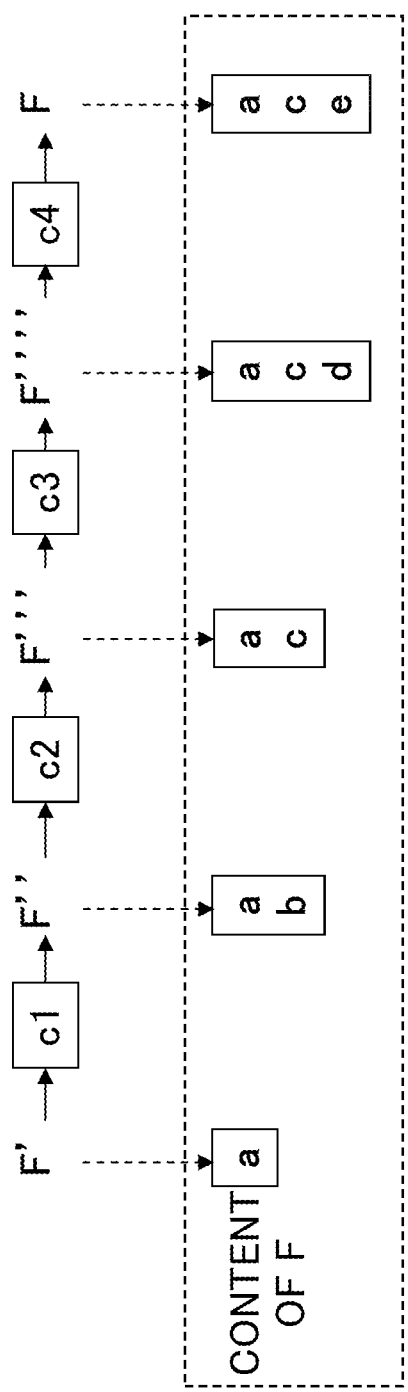
FIG. 14 illustrates a situation wherein a file F changes.

FIG. 14 illustrates a situation in which the commands c1 to c4 change the file F. In accordance with the flow of FIG. 11, a determination is made as to which of the commands c1 to c4 is a final-state forming command. Referring to c1, a difference A between the final file F and a file F', which is an input file of the command c1, corresponds to "c" and "e". A difference B between a file F'', which is an output file of the command c1, and a file F', which is an input file of the command c1, corresponds to "b". Thus, since the difference B is not included in the difference A, the analyzing process unit 15 determines that the command c1 is not a final-state forming command. For c2 to c4, the analyzing process unit 15 also identifies a final-state forming command in accordance with the flow of FIG. 11 and determines that c2 and c4 are final-state forming commands. Then, the analyzing process unit 15 adds the c2 and c4 to the set S of final-state forming commands.

Next, the analyzing process unit 15 focuses on the file G and selects a final-state forming command from the commands that change the file G. As illustrated in FIG. 12, commands c6 and c7 generate a side effect that changes a content of the file F. The analyzing process unit 15 performs a process of identifying a final-state forming command in accordance with the flow of FIG. 11 and determines that c7 is a final-state forming command. Then, the analyzing process unit 15 adds c7 to the set S of final-state forming commands.

Next, the analyzing process unit 15 newly determines that a command outputting input information (e.g., a file, a process, and an environmental variable), that is an input of each command of the set S of final-state forming commands, is a final-state forming command when the input information is different from the information output by that final-state forming command. The set S of final-state forming commands is {c0, c2, c4, c5, c7, c8}, and hence commands outputting a file that is an input of a final-state forming command are c1, c3, and c6.

Referring to c1, c1 outputs a file that is an input of c2 and c5. A file output by c2 is F and a file output by c5 is G, which means that c1 outputs F, i.e., a file different from the file G output by c5. Thus, the analyzing process unit 15 determines that c1 is a final-state forming command and adds c1 to the set S of final-state forming commands.

Referring to c3, c3 outputs a file that is an input of c4. A file output by c4 is F, and hence c3 does not output a file different from the file F output by c4. Thus, the analyzing process unit 15 determines that c3 is not a final-state forming command.

Referring to c6, c6 outputs a file that is an input of c7 and c8. A file output by c7 is G and a process output by c8 is P, which means that c6 outputs G, i.e., a file different from the process P output by c8. Thus, the analyzing process unit 15 determines that c6 is a final-state forming command and adds c6 to the set S of final-state forming commands.

Subsequently, the analyzing process unit 15 again extracts a command outputting an input file, that is an input of each command of the new set S, when the input file is different from a file output by that final-state forming command, and the analyzing process unit 15 newly determines that this extracted command is a final-state forming command. In addition, this operation is repeated until no command is newly judged to be a final-state forming command.

Figure 15:
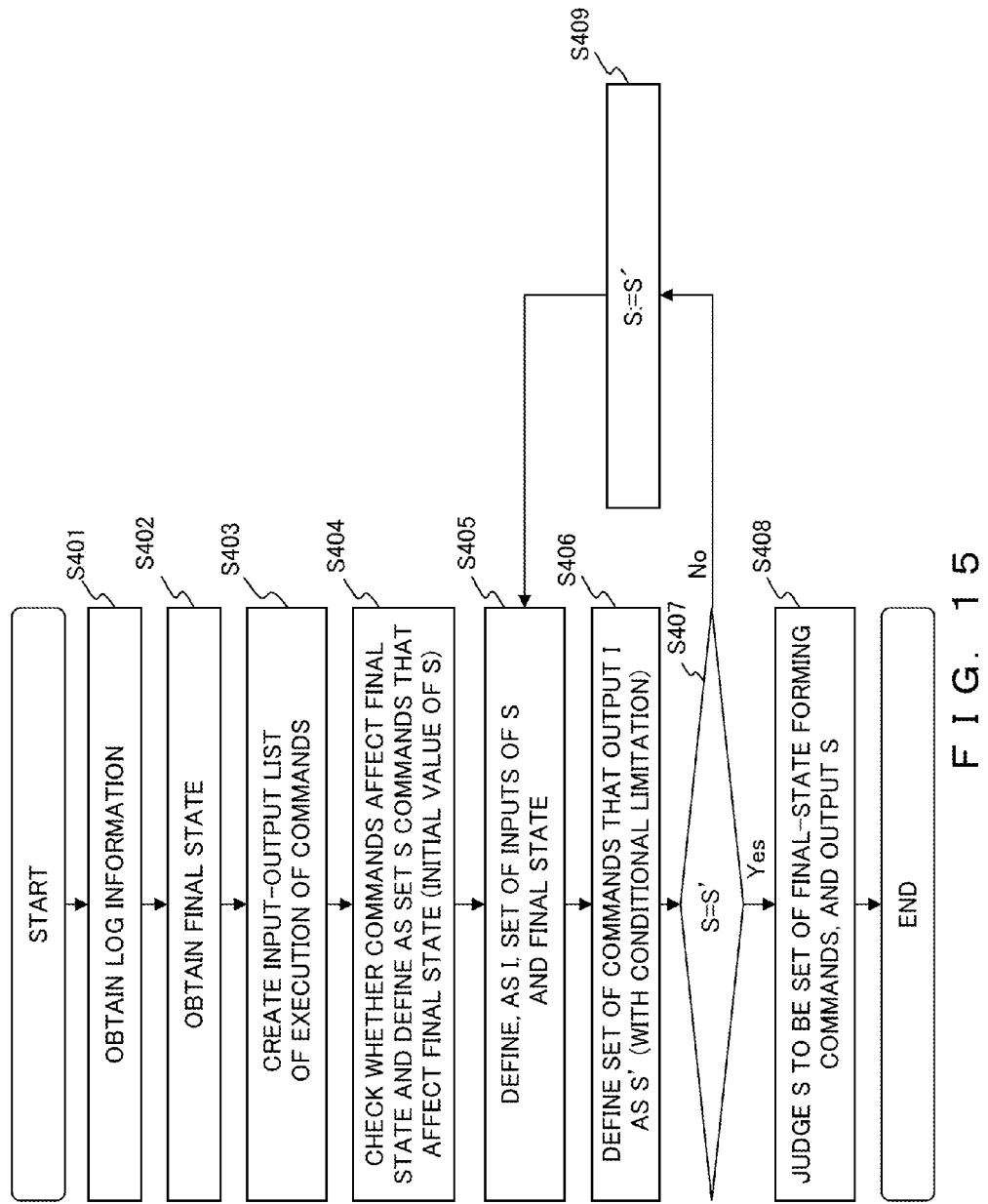
FIG. 15 illustrates an operation flow diagram of selection of a final-state forming command in accordance with the embodiment.

FIG. 15 illustrates an operation flow diagram of selection of a final-state forming command in accordance with the embodiment.

First, the analyzing process unit 15 obtains the log information saved in the log storing unit 14 (S401).

Next, the analyzing process unit 15 obtains a final state for which an installing process has been completed normally (S402). In the example of FIG. 12, the analyzing process unit 15 obtains {F, G, P} as a final state.

Next, the analyzing process unit 15 creates an input/output list of execution of commands in accordance with the log information (S403). In the example of FIG. 12, the analyzing process unit 15 creates the input-output list of FIG. 13.

Next, the analyzing process unit 15 checks whether the commands affect a final state and extracts a command that affects the final state as an initial value of a set S (S404). In particular, the analyzing process unit 15 defines as S commands extracted as a final-state forming command from among commands that have created a final file and a final process and commands that change a content of a final file in accordance with the flow of FIG. 11. In the example of FIG. 12, the analyzing process unit 15 extracts {c0, c2, c4, c5, c7, c8} as the initial value of S.

Next, the analyzing process unit 15 extracts, as I, a set of inputs of S and the final state (S405). In the example of FIG. 12, the inputs of S are {F", F"", G"}, and a set of the final state is {F, G, P}. Thus, the analyzing process unit 15 extracts {F, G, P, F", F"", G"} as the set I of the inputs of S and the final state.

Next, from among commands that output any of I, the analyzing process unit 15 extracts as S' a set of commands each of which outputs information different from information output by a command of S that has as an input information output by the command of the set of commands (S406). In the example of FIG. 12, a set H of commands that output any of I is H={c4, c7, c8, c1, c3, c6}. Stating that a command that outputs any of information of I and a command that receive the same information as an input correspond to each other leads to a situation wherein commands J that corresponds to H={c4, c7, c8, c1, c3, c6} is J={-, -, -, (c2, c5), c4, (c7, c8)}. {c1, c6} of H output information which is different from the information output by a corresponding command of J. When a plurality of corresponding commands such as c1 and c6 are present, any of the corresponding commands may output information different from the information output by H. Thus, in S406, the analyzing process unit 15 extracts {c1, c6} as S'.

In the process of S406, under a condition in which a command included in S is defined as C and a file included in final files is defined as D, a command that has output the file D is extracted as S when a file having a name different from that of the file D is generated via execution of the command C for the file D. When the file D is obtained by the command C and a command executed with a file E that is not included in the final files as an input, a command that has output the file E is extracted as S.

Next, the analyzing process unit 15 determines whether a command included in S is equal to a command included in S' (S407). When S is identical with S' (Yes in S407), S is judged to be a set of final-state forming commands (S408). Then, the process outputting unit 16 outputs S.

When S is different from S' (No in S407), the analyzing process unit 15 adds S' to the set S (S409). In the example of FIG. 12, the analyzing process unit 15 adds S'={c1, c6} to S={c0, c2, c4, c5, c7, c8}, thereby providing S={c0, c1, c2, c4, c5, c6, c7, c8}. Then, the process shifts to S405 to repeat S405 to S407. Consequently, in the example of FIG. 12, {c0, c1, c2, c4, c5, c6, c7, c8} are finally extracted as final-state forming commands in S408.

Next, with reference to FIG. 15, descriptions will be given of an operation of selection of a final-state forming command in an actual installing process.

FIG. 16 illustrates an exemplary procedure used in the installing of a patch file. First, contents of commands of (1) to (6) in FIG. 16 will be described.

(1) By "$ cd ~/tmp", a current directory migrates to ~/tmp that is a working directory.

(2) By "$ wget http:// . . . /p", the current directory obtains a patch file p from "http:// . . . /".

(3) By "$ cd dir0", the current directory is made to migrate to "dir 0". This example is based on the assumption that the current directory is mistakenly made to migrate to dir0.

(4) By "$ cd /usr/local/src/ . . . ", the current directory is made to migrate to "/usr/local/src/ . . . ", a directory in which a patch is installed.

(5) By "$ patch <~/tmp/p", a patch file "~/tmp/p" is installed in the current directory. Consequently, a file f is created in the current directory.

(6) By "$ cp f /usr/local/lib/ . . . ", the file f created via the installation of the patch is copied to "/usr/local/lib/ . . . ".

(7) By "$ rm ~/tmp/p", "~/tmp/p" is deleted.

In the example of FIG. 16, the final file is "/usr/local/lib/ . . . f".

First, the analyzing process unit 15 obtains the log information saved in the log storing unit 14 (S401) and obtains a final file (S402). In the example of FIG. 16, the analyzing process unit 15 obtains "/usr/local/lib/ . . . f" as a final file.

Next, the analyzing process unit 15 creates an input/output list of execution of commands in accordance with the log information (S403). In the example of FIG. 16, the analyzing process unit 15 creates the input-output list depicted in FIG. 17.

Next, the analyzing process unit 15 checks whether the commands affect a final state and extracts a command that affects the final state as an initial value of a set S (S404). In the example of FIG. 16, the analyzing process unit 15 extracts {cp f /usr/local/lib/ . . . } as the initial value of S.

Next, the analyzing process unit 15 extracts, as I, a set of inputs of S and a final state (S405). In the example of FIG. 16, the analyzing process unit 15 extracts {/usr/local/lib/ . . . f, /usr/local/src/ . . . f} as the set I of the inputs of S and the final state.

Next, from among commands that output any of I, the analyzing process unit 15 extracts as S' a set of commands each of which outputs a file different from a file output by a command of S that has as an input a file output by the command of the set of commands (S406). In the example of FIG. 16, the analyzing process unit 15 extracts {patch <~/tmp/p} as S'.

Next, the analyzing process unit 15 determines whether the value of S is equal to the value of S' (S407). S={cp f /usr/local/lib/ . . . } is different from S'={patch <~/tmp/p}. Thus, the process shifts to S409.

The analyzing process unit 15 adds S' to the set S (S409). In the example of FIG. 16, the analyzing process unit 15 adds S'={patch <~/tmp/p} to S={cp f /usr/local/lib/ . . . }, thereby providing S={cp f /usr/local/lib/ . . . , patch <~/tmp/p}.

The process shifts to S405, where the analyzing process unit 15 extracts {/usr/local/lib/ . . . f, /usr/local/src/ . . . f, ~tmp/p, ${PWD}=/usr/local/src/ . . . } as the set I of the inputs of S updated in S409 and the final state.

Next, from among commands that output any of I, the analyzing process unit 15 extracts as S' a set of commands each of which outputs information different from information output by a command of S that has as an input information output by the command of the set of commands (S406). In the example of FIG. 16, {patch <~/tmp/p, $ wget http:// . . . /p, $ cd /usr/local/src/ . . . } is extracted as S'.

The analyzing process unit 15 determines whether the value of S is equal to the value of S' (S407). S={cp f /usr/local/lib/ . . . , patch <~/tmp/p} is different from S'={patch <~/tmp/p, $ wget http:// . . . /p, $ cd /usr/local/src/ . . . }.

The analyzing process unit 15 adds S' to the set S (S409). In the example of FIG. 16, the analyzing process unit 15 provides S={cp f /usr/local/lib/ . . . , patch <~/tmp/p, $ cd /usr/local/src/ . . . , $ wget http:// . . . /p}.

The process shifts to S405 to repeat S405 to S407. Consequently, in the example of FIG. 16, the commands finally extracted as S are S={cpf /usr/local/lib/ . . . , patch<~/tmp/p, $ cd /usr/local/src/ . . . , $ wget http:// . . . /p, $ cd ~/tmp}.

Figure 18:
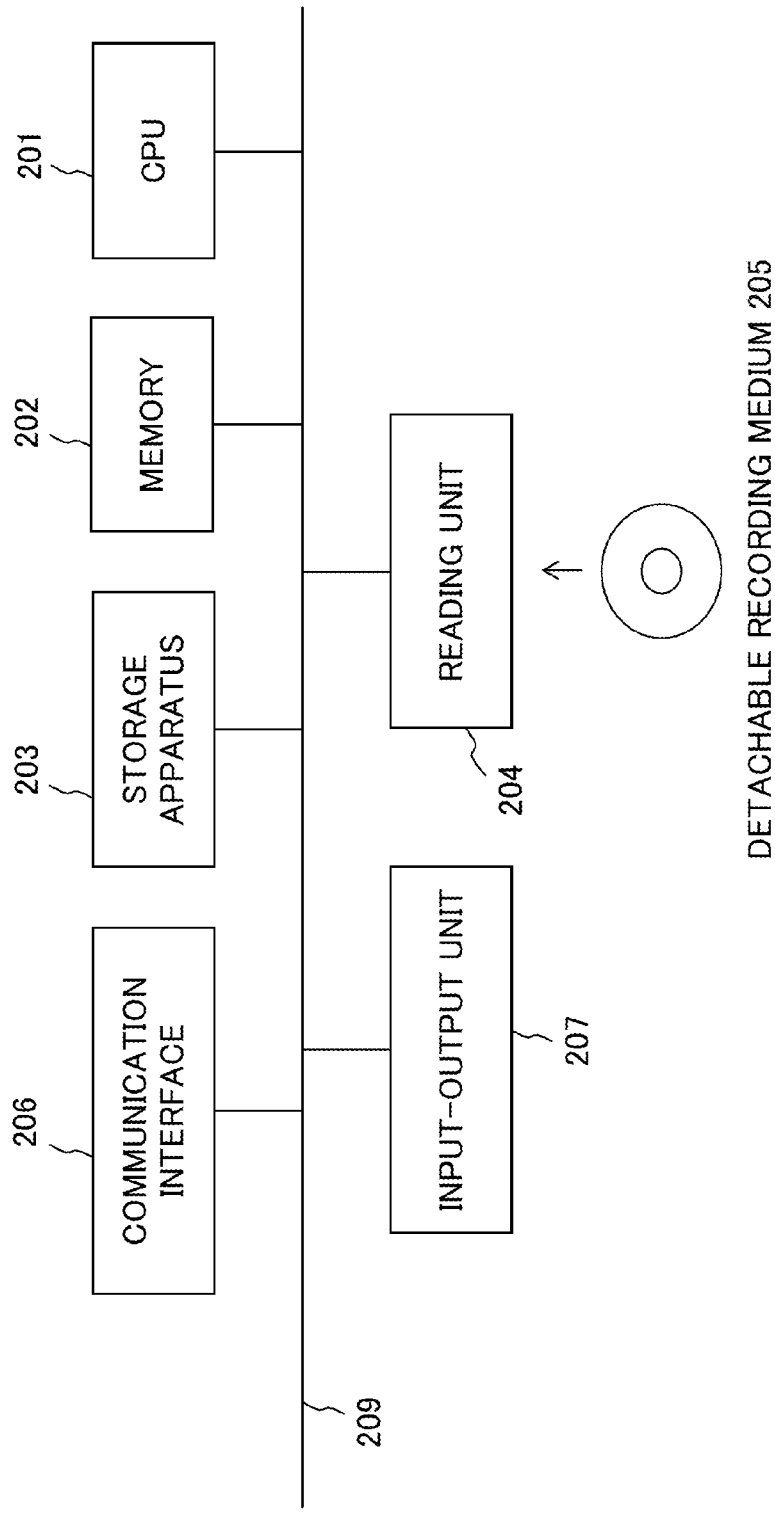
FIG. 18 illustrates an exemplary hardware configuration of an information processing apparatus in accordance with the embodiment.

FIG. 18 illustrates an exemplary hardware configuration of an information processing apparatus 1 in accordance with the embodiment. As illustrated in FIG. 18, a server includes a Central Processing Unit (CPU) 201, a memory 202, a storage apparatus 203, a reading unit 204, a detachable recording medium 205, a communication interface 206, and an input-output unit 207. The CPU 201, the memory 202, the storage apparatus 203, the reading unit 204, the communication interface 206, and the input-output unit 207 are connected to each other via, for example, a bus 209.

The CPU (a processor) 201 uses the memory 202 so as to execute a program that describes the procedures of the aforementioned flowcharts. The CPU 201 provides some of or all of the functions of the information obtaining unit 11, the command executing unit 12, the log saving processing unit 13, the analyzing process unit 15, and the process outputting unit 16.

The memory 202 is, for example, a semiconductor memory and is configured to include a Random Access Memory (RAM) region and a Read Only Memory (ROM) region. The memory 202 provides some of or all of the functions of the log storing unit 14.

The storage apparatus 203, which is, for example, a hard disk, provides some of or all of the functions of the log storing unit 14. The storage apparatus 203 may be a semiconductor memory such as a flash memory. The storage apparatus 203 may be an external recording apparatus.

The reading unit 204 accesses the detachable recording medium 205 in accordance with an instruction from the CPU 201. The detachable recording medium 205 is achieved by, for example, a semiconductor device (e.g., USB memory), a medium to which information is input and from which information is output via a magnetic action (e.g., magnetic disk), or a medium to which information is input and from which information is output via an optical action (e.g., CD-ROM or DVD). The reading unit 204 does not necessarily need to be provided. As a computer-readable recording medium that stores the program, a non-transitory recording medium such as the memory 202, the storage apparatus 203, and the detachable recording medium 205 is used.

The communication interface 206 transmits or receives data via a network in accordance with an instruction from the CPU 201. The communication interface 206 does not necessarily need to be provided.

The input-output unit 207 corresponds to, for example, a device that receives an instruction from a user. Using the input-output unit 207, the user inputs a command for an installing process to the information processing apparatus.

The information processing program to achieve the embodiment is provided to the server in, for example, the following forms.
(1) Installed in the storage apparatus 203 in advance
(2) Provided by the detachable recording medium 205
(3) Provided via a network The present embodiment is not limited to the aforementioned embodiments, but various configurations or embodiments may be used without departing from the spirit of the present embodiment.

In the aforementioned saving of a snapshot, files of the entirety of a file system are saved, but, as long as the content of a file affected by a side effect that occurs via the execution of a command is saved, the files of the entirety of the file system do not need to be saved.

The log saving process and the command extracting process may be performed by different information processing apparatuses 1.

The information processing apparatus in accordance with the present embodiment allows a procedure manual to be easily created that is related to the building of an environment to use the information processing apparatus.

All examples and conditional language recited herein are intended for pedagogical purposes to aid the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a processor configured to obtain a plurality of commands executed in an installation of software on the information processing apparatus, to obtain log information including a status of the information processing apparatus before and after execution of each of the plurality of commands, to detect target files that are present when the installation ends normally according to the log information, to obtain from the log information, a first information that indicates contents of the target files before execution of each of a plurality of target commands that change the contents of the detected target files, a second information that indicates the contents of the target files after execution of each of the plurality of target commands and a third information that indicates the contents of the target files when execution of the plurality of target commands completes normally, to extract one or more commands related to generation of the target files using the first, the second and the third information and to output the extracted commands.

2. The information processing apparatus according to claim 1, wherein
   the processor detects a plurality of objective files which are the files that are present when the installation ends normally, and
   when a difference between one objective file of the plurality of objective files before execution of an objective command that is any of one or more commands executed for the one objective file and the one objective file after the execution of the objective command is included in a difference between the one objective file at the time of a normal end of the installation and the one objective file before the execution of the objective command, the processor extracts the objective command.

3. The information processing apparatus according to claim 1, wherein
   the processor detects a plurality of objective files which are the files that are present when the installation ends normally, and extracts a plurality of commands to generate the plurality of objective files.

4. The information processing apparatus according to claim 2, wherein
   when a first file with a name that is different from a name of a second file output by a command is generated via execution of the extracted command for the second file, the processor extracts the command that has output the second file.

5. The information processing apparatus according to claim 2, wherein
   when the one objective file is obtained via the extracted command and a command executed with a nonobjective file, which is a file that is not present when the installation ends normally, as an input, the processor extracts a command that has output the nonobjective file.

6. An information processing method comprising:
   obtaining a plurality of commands executed in an installation of software on an information processing apparatus and obtaining log information including a status of the information processing apparatus before and after execution of each of the plurality of commands;
   according to the log information, detecting target files that are present when the installation ends normally;
   obtaining from the log information, a first information that indicates contents of the target files before execution of each of a plurality of target commands that change the contents of the detected target files, a second information that indicates the contents of the target files after execution of each of the plurality of target commands and a third information that indicates the contents of the target files when execution of the plurality of target commands completes normally;
   extracting one or more commands related to generation of the target files using the first, the second and the third information; and
   outputting the extracted commands.

7. The information processing method according to claim 6, wherein
   the extracting detects a plurality of objective files which are the files that are present when the installation ends normally, and
   when a difference between one objective file of the plurality of objective files before execution of an objective command that is any of one or more commands executed for the one objective file and the one objective file after the execution of the objective command is included in a difference between the one objective file at the time of a normal end of the installation and the one objective file before the execution of the objective command, the extracting extracts the objective command.

8. The information processing method according to claim 6, wherein
   the extracting detects a plurality of objective files which are the files that are present when the installation ends normally, and extracts a plurality of commands to generate the plurality of objective files.

9. The information processing method according to claim 7, further comprising:
   when a first file with a name that is different from a name of a second file output by a command is generated via execution of the extracted command for the second file, extracting the command that has output the second file.

10. The information processing method according to claim 7, further comprising:
    when the one objective file is obtained via the extracted command and a command executed with a nonobjective file, which is a file that is not present when the installation ends normally, as an input, extracting a command that has output the nonobjective file.

11. A non-transitory computer-readable recording medium having stored therein an information processing program for causing a processor to execute a process comprising:
    obtaining a plurality of commands executed in an installation of software on an information processing apparatus and obtaining log information including status of the information processing apparatus before and after execution of each of the plurality of commands;
    according to the log information, detecting target files that are present when the installation ends normally;
    obtaining from the log information, a first information that indicates contents of the target files before execution of each of a plurality of target commands that change the contents of the detected target files, a second information that indicates the contents of the target files after execution of each of the plurality of target commands and a third information that indicates the contents of the target files when execution of the plurality of target commands completes normally;

extracting one or more commands related to generation of the target files using the first, the second and the third information; and outputting the extracted commands.

12. The non-transitory computer-readable recording medium according to claim 11, wherein the extracting detects a plurality of objective files which are the files that are present when the installation ends normally, and when a difference between one objective file of the plurality of objective files before execution of an objective command that is any of one or more commands executed for the one objective file and the one objective file after the execution of the objective command is included in a difference between the one objective file at the time of a normal end of the installation and the one objective file before the execution of the objective command, the extracting extracts the objective command.

13. The non-transitory computer-readable recording medium according to claim 11, wherein the extracting detects a plurality of objective files which are the files that are present when the installation ends normally, and extracts a plurality of commands to generate the plurality of objective files.

14. The non-transitory computer-readable recording medium according to claim 12, the process executed by the processor further comprising:

when a first file with a name that is different from a name of a second file output by a command is generated via execution of the extracted command for the second file, extracting the command that has output the second file.

15. The non-transitory computer-readable recording medium according to claim 12, the process executed by the processor further comprising:

when the one objective file is obtained via the extracted command and a command executed with a nonobjective file, which is a file that is not present when the installation ends normally, as an input, extracting a command that has output the nonobjective file.

* * * * *